(12) United States Patent
Egly

(10) Patent No.: US 12,512,191 B2
(45) Date of Patent: Dec. 30, 2025

(54) SYSTEM FOR INSURANCE UNDERWRITING AND POST POLICY ISSUANCE ACTION

(71) Applicant: Mark Egly, Johnston, IA (US)

(72) Inventor: Mark Egly, Johnston, IA (US)

(73) Assignee: Mark Egly, Johnston, IA (US)

( * ) Notice: Subject to any disclaimer, the term of this patent is extended or adjusted under 35 U.S.C. 154(b) by 93 days.

(21) Appl. No.: 17/528,260

(22) Filed: Nov. 17, 2021

(65) Prior Publication Data

US 2022/0165374 A1  May 26, 2022

Related U.S. Application Data

(60) Provisional application No. 63/116,214, filed on Nov. 20, 2020.

(51) Int. Cl.
| | | |
|---|---|---|
| *G16H 10/60* | (2018.01) | |
| *G06Q 40/08* | (2012.01) | |
| *G16H 10/40* | (2018.01) | |
| *G16H 50/20* | (2018.01) | |
| *G16H 50/30* | (2018.01) | |

(52) U.S. Cl.
CPC .............. *G16H 10/60* (2018.01); *G06Q 40/08* (2013.01); *G16H 10/40* (2018.01); *G16H 50/20* (2018.01); *G16H 50/30* (2018.01)

(58) Field of Classification Search
CPC ........... G01N 33/5091; G01N 33/6893; G16H 10/60; G16H 10/40; G16H 50/20; G16H 50/30; G06Q 40/08
See application file for complete search history.

(56) References Cited

U.S. PATENT DOCUMENTS

| | | | |
|---|---|---|---|
| 7,685,008 B2 | 3/2010 | McGiffin et al. | |
| 7,844,477 B2 | 11/2010 | Bonissone et al. | |
| 7,895,062 B2 | 2/2011 | Bonissone et al. | |
| 8,566,128 B2 | 10/2013 | Koziol | |
| 8,793,146 B2 | 7/2014 | Bonissone et al. | |
| 2009/0094065 A1* | 4/2009 | Hyde ..................... | G06Q 10/10 705/4 |
| 2009/0299645 A1* | 12/2009 | Colby ..................... | G16B 20/10 506/7 |
| 2013/0290023 A1* | 10/2013 | Hight ..................... | G06Q 40/08 705/3 |
| 2022/0189589 A1* | 6/2022 | Ogawa ..................... | G16H 50/30 |

OTHER PUBLICATIONS

Health Care Cost and Utilization Associated With Alpha-1 Antitrypsin Deficiency Among A Cohort of Medicare Beneficiaries With Copd Zacherle, E et al. Value in Health, vol. 18, Issue 7, A664 (Year: 2015).*

* cited by examiner

*Primary Examiner* — Mark Holcomb
(74) *Attorney, Agent, or Firm* — Jordan E. Meggison-Decker; BrownWinick Law Firm

(57) ABSTRACT

A system for insurance underwriting and post policy issuance action comprising obtaining personal, medical, and genetic information for an applicant and determining the applicant's eligibility for an insurance policy is provided. The applicant may additionally be provided with information regarding genetic testing for alpha-1 antitrypsin deficiency or with information regarding testing of circulating AAT levels. Furthermore, alpha-1 antitrypsin testing may be ordered for the applicant as part of the insurance underwriting process or for the insured following policy acceptance or issuance.

25 Claims, 5 Drawing Sheets

SYSTEM FOR INSURANCE UNDERWRITING AND POST POLICY ISSUANCE ACTION

CROSS-REFERENCE TO RELATED APPLICATIONS

This patent application claims priority to U.S. Provisional Patent Application No. 63/116,214 filed on Nov. 20, 2020, the entirety of which is incorporated herein fully by reference.

FIELD OF THE DISCLOSURE

This disclosure relates generally to a system for post issuance of insurance policies, and in particular to a system to assist insureds in obtaining confidential genetic information and using the genetic information in the process of assisting an insured to potentially improve his or her health outlook. In one arrangement, the disclosure relates to a method of obtaining a person's previously performed genetic testing as part of an application for life, health, or other insurance. In another arrangement, the disclosure relates to a method of ordering genetic testing as part of an application for life, health, or other insurance. In another arrangement, information about a particular genetic flaw is determined using a device for at-home testing. In another arrangement, information about particular genetic flaws is provided to potential insureds as part of an application for life, health, or other insurance.

BACKGROUND OF THE DISCLOSURE

A genetic predisposition, also known as a genetic susceptibility, is an increased likelihood of developing a particular disease due to the presence of one or more mutations or a family history that indicates an increased risk of the disease. A genetic predisposition for a disease is not a diagnosis of the disease or a guarantee that a person will contract the disease. A person with knowledge of a genetic susceptibility can implement lifestyle choices or seek medical intervention in an attempt to prevent onset of the disease, and can at least be aware of their increased risk and seek early treatment if symptoms of the disease occur.

A carrier of a disease is a person who has inherited a recessive allele for a mutation indicative of the disease. A carrier usually does not show symptoms of the disease, but is able to pass the allele onto their offspring, who may contract the disease. A person with knowledge that he or she is a carrier of a disease can implement lifestyle choices or seek medical intervention for their children in an attempt to prevent or treat the disease, and can at least be aware of the child's increased risk and seek early treatment if symptoms of the disease occur.

Tests may be ordered by a medical practitioner to determine if a patient has a genetic predisposition to a disease or is a carrier of the disease. In addition, many genetic testing services have emerged recently that allow consumers to directly purchase genetic profile reports based on a person's unique DNA. Companies such as 23andMe and Ancestry.com offer personalized reports that can indicate whether a person has a genetic predisposition to certain conditions or is a carrier of certain conditions.

Despite the advantages that could be realized by genetic testing to determine a person's genetic predispositions to disease or risk of passing a disease to offspring, some choose not to pursue genetic testing out of fear that the information revealed by their genetic profile could be used to their disadvantage. An example where genetic information could be damaging to a person is the insurance underwriting process. For example, while applying for a life insurance policy, the potential insured is asked a long series of intrusive questions regarding their physical and mental health, and in many cases a physical examination including extensive bloodwork is ordered. If the potential insured has received any medical care at all in recent years, their medical history is scrutinized, and insurance may be denied or offered at a higher premium due to increased risk. Genetic information is currently not included in the insurance underwriting process; however, for fear of being unable to obtain life insurance or of suffering other repercussions, many choose to remain ignorant of the genetic information that could improve their quality of life, improve their children's quality of life, or even prolong their lives. Knowledge of inherited conditions could impact not only the person seeking the genetic information, but also their living relatives and generations to come.

The Genetic Information Nondiscrimination Act of 2008 ("GINA") is U.S. federal law that prohibits discrimination on the basis of genetic information with respect to health insurance and employment. However, GINA does not prevent third party vendors from sharing their information with insurance companies.

Alpha-1 antitrypsin ("AAT") is a protein produced by the liver that protects the lungs from inflammation caused by infection and inhaled irritants. Alpha-1 antitrypsin deficiency, also known as AATD, Alpha-1, or inherited emphysema, is a rarely diagnosed inherited condition that raises a person's risk for serious lung disease in adults or liver disease at any age. AATD occurs when a person's AAT is abnormal and cannot be released from the liver at the normal rate. This leads to a build-up of abnormal AAT in the liver that can cause liver disease, and decreased levels of AAT reaching the lungs which can lead to lung disease. There is no cure for AATD, but detection and treatment can help people with AATD manage symptoms and have better quality of life. AATD can be detected using genetic testing.

For the reasons stated above, and for other reasons which will become apparent to those skilled in the art upon reading and understanding the specification, there is a need in the art for an improved system for insurance underwriting and post policy issuance action.

Thus it is a primary object of the disclosure to provide a system for insurance underwriting that incentivizes individuals to seek genetic testing that could improve quality of life and prolong lives.

Another object of the disclosure is to provide a system for insurance underwriting and post policy issuance action that incentivizes insurance providers to inform potential insureds of the advantages of genetic testing.

Another object of the disclosure is to provide a system for insurance underwriting and post policy issuance action that incentivizes insurance providers to provide access to genetic testing.

Another object of the disclosure is to provide a system for post insurance policy acceptance and post policy delivery action that incentivizes the insurance providers to provide access to genetic testing for their insureds. Thus, insureds whom were not tested for previously unknown DNA flaws, genetic diseases, and AATD may become aware of treatments that may potentially improve the quality of life for the insureds and extend their lives.

These and other objects, features, or advantages of the present disclosure will become apparent from the specification and claims.

BRIEF SUMMARY OF THE DISCLOSURE

The disclosure relates to a system for insurance underwriting and post policy issuance action using genetic information previously obtained by an individual. The disclosure relates to a system for insurance underwriting and post policy issuance action using genetic information obtained through genetic testing ordered by an insurance provider. The disclosure relates to a system for insurance underwriting and post policy issuance action in which insurance providers supply information to insured individuals or potential insured individuals regarding the availability of genetic testing. Furthermore, the disclosure relates to a system for insurance underwriting and post policy issuance action in which insurance providers supply genetic testing to insured individuals or potential insured individuals. The disclosure relates to a system post insurance policy acceptance and post policy delivery action that incentivizes the insurance providers to provide access to genetic testing for their insureds; thus, insureds whom were not tested for previously unknown DNA flaws, genetic diseases, and AATD may become aware of treatments that may potentially improve the quality of life for the insureds and extend their lives.

DETAILED DESCRIPTION

In the following detailed description of the embodiments, reference is made to the accompanying drawings which form a part hereof, and in which is shown by way of illustration specific preferred embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the present disclosures. The following detailed description is, therefore, not to be taken in a limiting sense, and the scope of the present disclosure is defined only by the appended claims, along with the full scope of equivalents to which such claims are entitled.

As used herein, the terminology such as vertical, horizontal, top, bottom, front, back, end and sides are referenced according to the views presented. It should be understood, however, that the terms are used only for purposes of description, and are not intended to be used as limitations. Accordingly, orientation of an object or a combination of objects may change without departing from the scope of the disclosure.

As used in this disclosure, the term AATD may refer to the state of having an AATD genotype or to the state of having low levels of circulating AAT in the body. In some cases, patients may have just one deficient allele, and are thus not diagnosed as being AATD, yet the patient is incapable of producing sufficient levels of AAT and a number of comorbid conditions may occur.

System for Insurance Underwriting and Post Policy Issuance Action 100

Figure 1:
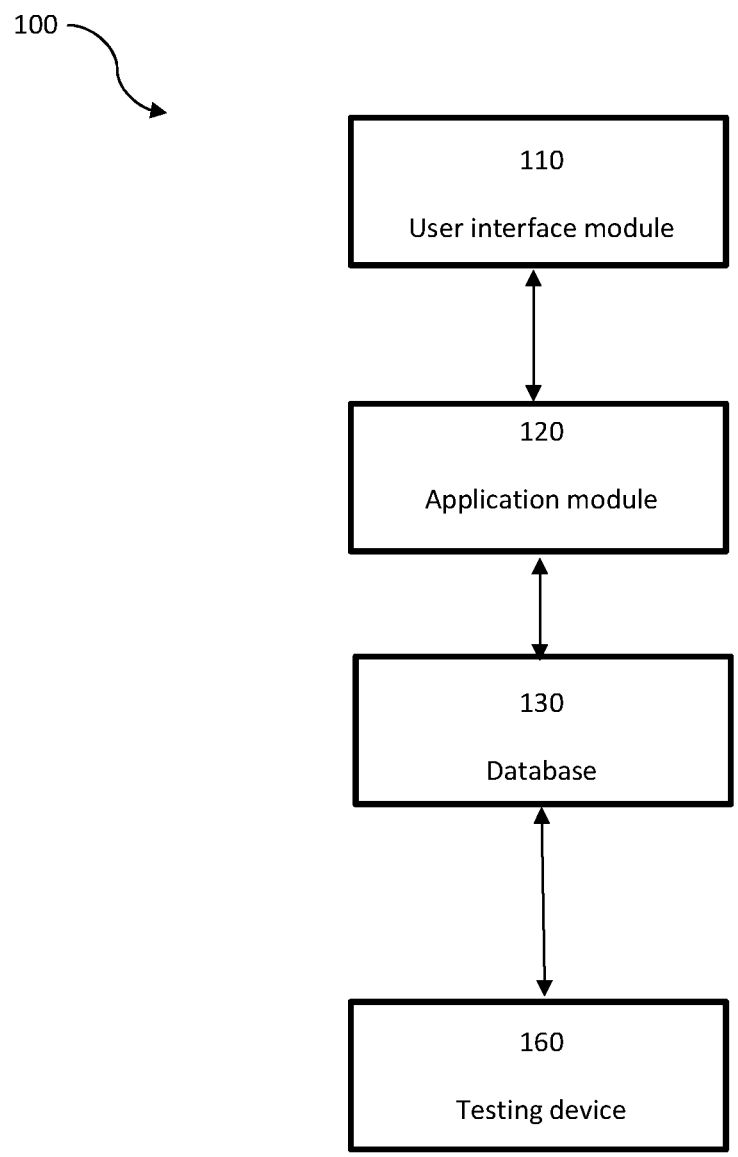
FIG. 1 depicts a system for insurance underwriting and post policy issuance action according to one embodiment.

Insurance underwriting may be performed by a human underwriter or by an automated system. As shown in FIG. 1, an example of an automated system for insurance underwriting and post policy issuance action 100 comprises a user interface module 110 and a database 130. User interface module 110 may be directly coupled to database 130, or user interface module 110 may be coupled to database 130 through an application module 120.

User Interface Module 110

Software running on user interface module 110 is configured to allow applicants, agents, and underwriters to input and retrieve data in a form that is readable by humans. The user interface module 110 may run software that is configured to communicate with the database 130 using SQL or a similar language or system. An applicant, agent, or insurance underwriter can use an input device of user interface module 110 and software running on user interface module 110 to input personal, medical, and genetic information about an applicant. Software running on user interface module 110 communicates the personal, medical, and genetic information to database 130, either through direct communication with database 130 or via application module 120, and converts the information to a form that can be stored on and retrieved from database 130. An applicant, agent, or insurance underwriter can also use an input device of user interface module 110 and software running on user interface module 110 to retrieve information from database 130 regarding applicant's insurance application.

The user interface module 110 comprises a computer, tablet, smartphone, terminal, or any similar device capable of digital communication. The user interface module 110 may reside remotely or on the same device as application module 120 and/or database 130. Any network, channel, or system capable of transmitting and receiving digital signals may connect user interface module 110, application module 120, and database 130 to each other.

Application Module 120

The application module 120, if present, translates inputs and queries from user interface module 110 into a form that is usable by database 130. The application module 110 may run software that is configured to communicate with the database 130 using SQL or a similar language or system.

The application module 120 comprises a computer, tablet, smartphone, terminal, or any similar device capable of digital communication. Application module 120 is configured to run software that uses or manipulates data stored in database 130. The application module 110 may reside remotely or on the same device as application module 120 and/or database 130. Any network, channel, or system capable of transmitting and receiving digital signals may connect user interface module 110, application module 120, and database 130 to each other.

Database 130

Database 130 is configured to store personal, medical, and genetic information about applicants and insureds. Database 130 is also configured to store underwriting rules.

Database 130 comprises a computer, server, or similar device capable of sending, receiving, processing, and storing digital information. Personal information, medical information, genetic information, and other data about applicants obtained during an insurance underwriting process 200//400/600/700 are stored in database 130. Additionally, rules as defined by the underwriting guidebook are encoded in database 130. User interface module 110 and/or application module 120 communicate with database 130 to store and retrieve applicant data, categorizations, and eligibility information.

Testing Device 160

A testing device 160 is configured to collect a biological sample such as a blood sample from an individual such as an insurance applicant, determine a genotype and/or phenotype indicative of whether individual has AAT deficiency (AATD) by analyzing the biological sample, and output the result of the analysis. The testing device 160 may be used at home or in a medical provider's office. The testing device 160 allows for an individual to determine whether he or she has AAT deficiency at home or in another private setting. By testing privately, an individual can obtain potentially life-saving information without sabotaging future insurance applications, and can decide whether to provide test results to third parties such as insurance companies.

Testing device 160 may include, for example, a detection means, a collection device, containers, instructions, and information describing AAT, AAT deficiency, and treatment options for individuals having AAT deficiency or one or more diseases or disorders associated with AAT deficiency.

Detection means may detect the circulating AAT level of the biological sample. Alternatively, detection means may perform a genotyping assay to determine what alleles of the Serpinal gene are present in the biological sample.

Figure 2:
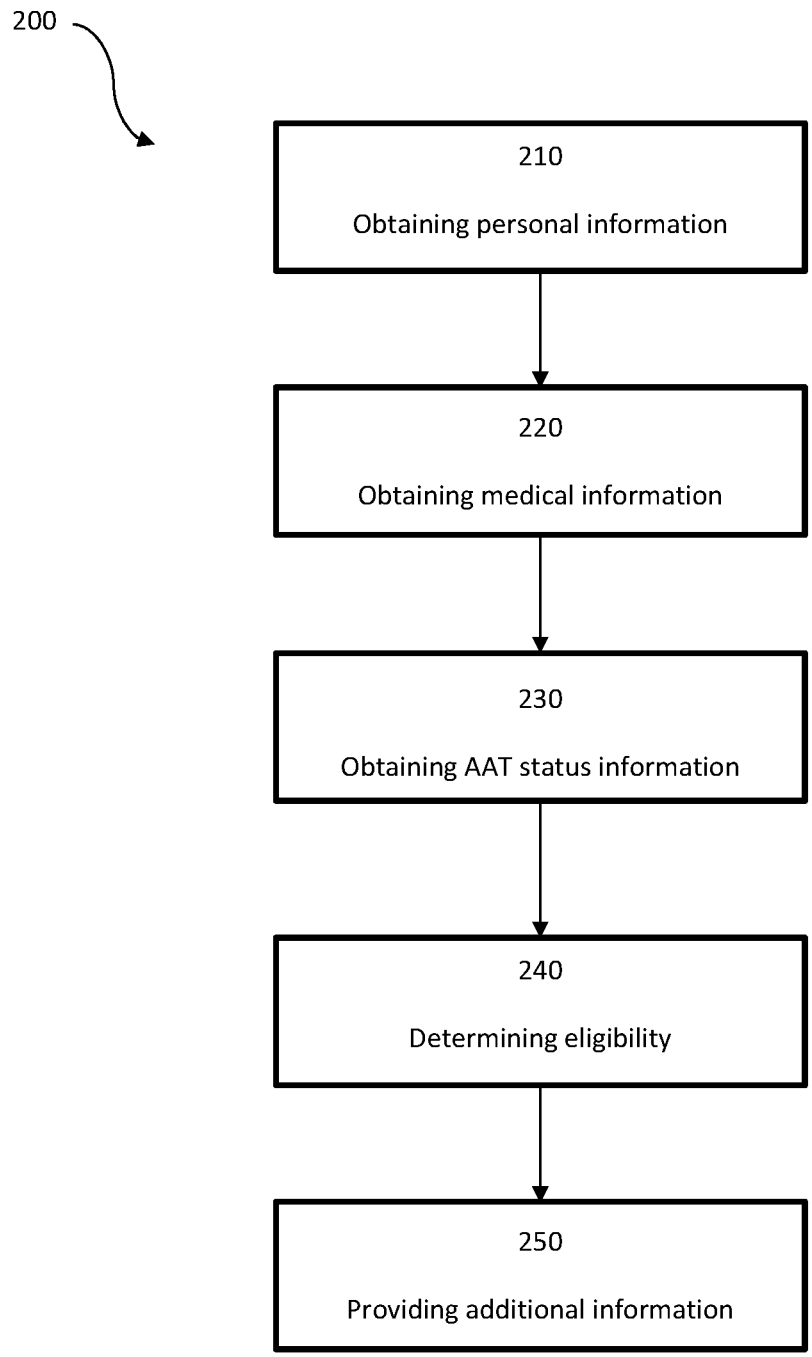
FIG. 2 depicts a method for insurance underwriting and post policy issuance action according to one embodiment.

A Method for Insurance Underwriting and Post Policy Issuance Action as Depicted in FIG. 2

Obtaining Personal Information

As shown in FIG. 2, a method for insurance underwriting and post policy issuance action 200 begins at step 210 in which personal information about an applicant is collected or obtained, either directly or through an agent. Personal information includes identifying information about the applicant and information about the applicant's occupation and habits.

Personal information may include name, date of birth, gender, home address, social security number, employer name, employer address, military service status, credit history, and whether the applicant smokes, consumes alcohol or recreational drugs, exercises, or engages in dangerous activities such as skydiving, racing, or rock climbing.

Personal information may be obtained using a paper form, a phone interview, or an automated underwriting system 100. Personal information may also be obtained by requesting information from third parties. For example, the applicant's credit score may be obtained through an inquiry to some or all credit reporting agencies. The applicant may provide a release giving the insurance agent or underwriter permission to obtain the applicant's personal information from a third party.

Obtained personal information is entered using an input device of user interface module 110. User interface module 110 or application module 120 format the personal information and store it in database 130.

Obtaining Medical Information

The method 200 further comprises step 220 in which medical information or medical history information is collected or obtained about the applicant, either directly or through an agent. Obtaining medical information 220 typically comprises completing a lengthy questionnaire regarding symptoms, diagnoses, hospitalizations, and treatments received for several enumerated medical and mental health conditions the applicant may have encountered over a defined period of time.

Medical information may include an indication of whether the applicant has experienced or been diagnosed or treated for: shortness of breath, chest pain, palpitations, heart abnormality, anemia, blood or blood vessel disease, hypertension, tuberculosis, asthma, obstructive sleep apnea, pleurisy, other disorder of the lungs, convulsions, epilepsy, stroke, loss of consciousness, brain or nervous disorder, post-traumatic stress disorder, anxiety, depression, mental illness, presence of albumin or sugar or pus or blood in urine, any disease or disorder of the kidneys or bladder or prostate, growth, tumor, malignancy, cancer, skin disease, bone disease, joint disease, arthritis, rheumatism, excessive alcohol or drug use, advice to limit or cease or receive counseling for alcohol or drug use, disease or disorder resulting in rejection or higher premiums or reduction in insurance by any insurance company, AIDS, AIDS related complex, AIDS-related condition, ulcer, jaundice, gall stones, chronic diarrhea, digestive or intestinal disorder, illness or injury for which a physician or other practitioner was consulted, disease or physical deformity, surgical procedure, hospitalization, hereditary disease, arrest or moving violation or license suspension or revocation for driving while intoxicated, request for or receipt of pension or benefits or payment because of an injury or sickness or disability, use of nicotine delivery products, scheduled or anticipated surgical procedures, planned travel or residence in a foreign country, past participation or plans to participate in automobile racing or mountain climbing or ultra-light aircraft flying or hang gliding or ballooning or sky diving or powerboat racing or motorcycle racing or scuba diving or commercial or private piloting or any other hazardous occupation or sport or activity. Medical information may also include an indication of whether the applicant's parents or siblings have experienced or been diagnosed or treated for diabetes, cancer, heart disease, kidney disease, mental illness, suicide, or hereditary disease.

Obtaining medical information 220 also typically comprises obtaining results of a physical examination. An insurance underwriter or agent may conduct or have conducted an examination to obtain medical information such as the applicant's weight, height, blood pressure, and pulse rate. As part of the physical examination, blood and urine tests may be ordered to determine the applicant's cholesterol level, whether the applicant has recently consumed alcohol or drugs, or the presence of other conditions.

Medical information may be obtained using a paper form, a phone interview, or an automated underwriting system 100. Medical information may also be obtained by requesting information from third parties. For example, the applicant's medical history may be obtained through an inquiry to some or all of applicant's medical providers. The applicant may provide a release giving the insurance agent or underwriter permission to obtain the applicant's medical information from a third party.

Obtained medical information is entered using an input device of user interface module 110. User interface module 110 or application module 120 format the medical information and store it in database 130.

Obtaining Information Regarding the Applicant's AAT Status

The method 200 further comprises step 230 in which information is ordered, collected, or obtained about the applicant's AAT status, either directly or through an agent. The information about the applicant's AAT status may comprise genetic information, namely whether the patient has an AATD genotype. Genetic information includes information regarding the applicant's unique genetic profile, including whether the applicant has a genetic predisposition for a disease or is a carrier of a disease.

Genetic information may include whether the applicant has a genetic predisposition to or is a carrier of AAT deficiency, lung cancer, breast cancer, prostate cancer, other cancers, or other diseases or disorders.

Obtaining information about the applicant's AAT status 230 may comprise obtaining information about previous genetic testing from the applicant via a paper form, phone interview, or automated underwriting system 100. Obtaining genetic information may alternatively comprise obtaining information about previous genetic testing from a third party such as a private genetic testing service or a medical provider. Previous genetic testing may have been performed by a medical provider, a private genetic testing company such as 23andMe or Geneology.com, or using a testing device 160. Alternatively, obtaining genetic information may comprise ordering genetic testing for the applicant by a third party such as a private genetic testing service or a medical provider. Genetic testing may be ordered from a medical provider, a private genetic testing company such as 23andMe or Geneology.com, or using a testing device 160. The applicant may provide a release giving the insurance agent or underwriter permission to obtain the applicant's genetic information from a third party.

Alternatively, obtaining information about the applicant's AAT status 230 may comprise obtaining information about the applicant's circulating AAT level. Obtaining information about the applicant's circulating AAT level may comprise obtaining information about previous testing from the applicant via a paper form, phone interview, or automated underwriting system 100. Obtaining information about the applicant's circulating AAT level may alternatively comprise obtaining information about previous testing from a third party such as a private testing service or a medical provider. Previous testing may have been performed by a medical provider, a private testing company, or using a testing device 160. Alternatively, obtaining information about the applicant's circulating AAT level may comprise ordering testing for the applicant by a third party such as a private testing service or a medical provider. Testing may be ordered from a medical provider, a private testing company, or using a testing device 160. The applicant may provide a release giving the insurance agent or underwriter permission to obtain the applicant's information from a third party.

Obtained AAT information is entered using an input device of user interface module 110. User interface module 110 or application module 120 format the genetic information and store it in database 130.

Determining Eligibility

Once personal, medical, and genetic information about the applicant have been obtained, the method 200 proceeds to step 240 in which eligibility for an insurance policy is determined. Determining the applicant's eligibility for an insurance policy 240 may include determining one or more levels of coverage at which the applicant may obtain an insurance policy, the premium the applicant would have to pay for each level of coverage offered, and even whether to offer a policy to the applicant at all.

Each insurance company has its own underwriting manual that defines rules that the company follows for determining eligibility. Using personal, medical, and genetic information obtained in previous steps of method 200 as well as data from actuarial tables and rules from the insurance company's guidebook, the applicant is assigned one or more categories based on the risk of insuring the applicant. This categorization may be assigned using rules encoded in database 130 and accessed by software running on user interface module 110 or application module 120. The initial categorization may be adjusted based on other factors. For example, an applicant with a chronic condition may be assigned a more favorable classification if actively taking steps to improve his or her health and undergoing preventive care.

Providing Additional Information

After determining eligibility at step 240, the applicant is referred to as the insured, and as an optional step to method 200 additional information may be provided to the insured in step 250. Additional information may include information about the advantages of obtaining genetic testing to determine if the insured has a genetic predisposition to or is a carrier of one or more conditions or information about the advantages of obtaining a test of circulating AAT in the applicant's body or information about the advantages of both types of testing. In particular, additional information about AAT deficiency, the advantages to determining whether the applicant has AAT deficiency or low AAT levels, or instructions for obtaining an AAT test may be provided to the insured at any point after eligibility has been determined in step 240. Additional information may also include instructions for obtaining an at-home AAT testing device 160 to determine if the insured is AAT deficient or has low circulating AAT levels in a private setting. The insurance provider may provide information and/or test materials free of charge to help their current insureds identify post policy issuance health benefits.

Figure 3:
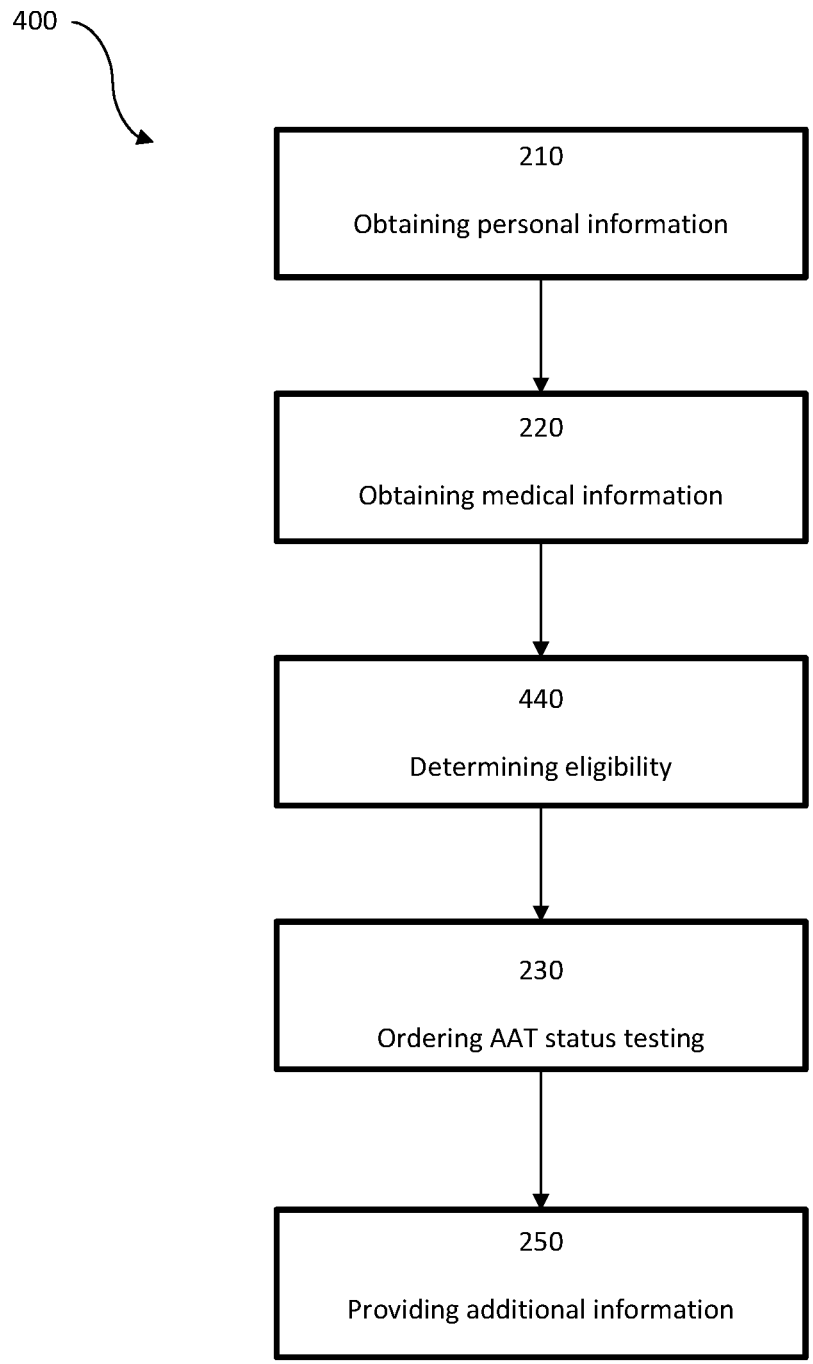
FIG. 3 depicts a method for insurance underwriting and post policy issuance action according to one embodiment.

A Method for Insurance Underwriting and Post Policy Issuance Action as Depicted in FIG. 3

Obtaining Personal Information

As shown in FIG. 3, an alternative method for insurance underwriting and post policy issuance action 400 begins at step 210 in which personal information about an applicant is obtained. Obtaining personal information 210 proceeds in the same manner as previously described with respect to method 200.

Obtaining Medical Information

Method 400 further comprises step 220 in which medical information about the applicant is obtained. Obtaining medical information 220 proceeds in the same manner as previously described with respect to method 200.

Determining Eligibility

Once personal and medical information about the applicant have been obtained, the method 400 proceeds to step 440 in which eligibility for an insurance policy is determined. Determining eligibility in accordance with step 440 proceeds largely in the same manner as for step 240; however, to prevent discrimination based on genetic information, genetic information and/or AAT status information is not obtained prior to determining eligibility 440, and genetic information and/or AAT status information is not used to determine applicant's eligibility for an insurance policy.

Determining the applicant's eligibility for an insurance policy 440 may include determining one or more levels of coverage at which the applicant may obtain an insurance policy, the premium the applicant would have to pay for each level of coverage offered, and even whether to offer a policy to the applicant at all.

Each insurance company has its own underwriting manual that defines rules that the company follows for determining eligibility. Using personal and medical information obtained in previous steps of method 400 as well as data from actuarial tables and rules from the insurance company's guidebook, the applicant is assigned one or more categories based on the risk of insuring the applicant. This categorization may be assigned using rules encoded in database 130 and accessed by software running on user interface module 110 or application module 120. The initial categorization may be adjusted based on other factors. For example, an applicant with a chronic condition may be assigned a more favorable classification if actively taking steps to improve his or her health and undergoing preventive care.

Obtaining Information Regarding the Insured's AAT Status

At any point after eligibility has been determined in step 440, the applicant is referred to as the insured, and the method 400 proceeds to step 230 in which testing to determine information about the insured's AAT status is ordered. Ordering information about the insured's AAT status 230 proceeds in the same manner as previously described with respect to method 200; however, the insured's AAT status may be kept confidential and not provided to the insurance provider. After eligibility for an insurance policy is determined at step 440, the insured is under no obligation to supply any information related to genetic testing or determination of AAT levels as determined in step 440 to the insurance provider. Testing to determine the insured's AAT status benefits the insured by allowing the insured to seek treatment that improves his or her quality of life and potentially extends his or her life. Further, the insurance provider benefits when insureds seek such treatment as fewer health, life, disability, or long term care insurance claims requiring payment by the insurance provider.

Providing Additional Information

As an optional step to method 400, additional information may be provided to the insured in step 250. Providing additional information 250 proceeds in the same manner as previously described with respect to method 200.

Figure 4:
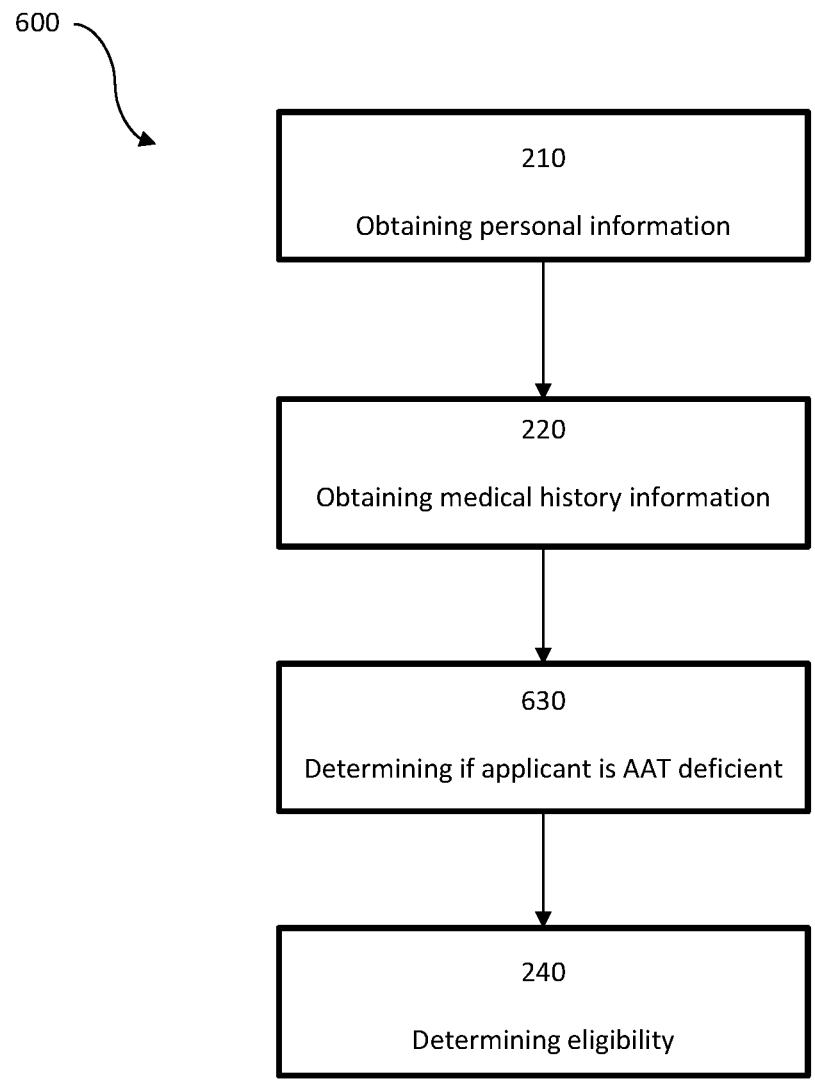
FIG. 4 depicts a method for insurance underwriting and post policy issuance action according to one embodiment.

A Method for Insurance Underwriting and Post Policy Issuance Action as Depicted in FIG. 4

Obtaining Personal Information

As shown in FIG. 4, an alternative method for insurance underwriting and post policy issuance action 600 begins at step 210 in which personal information about an applicant is obtained. Obtaining personal information 210 proceeds in the same manner as previously described with respect to method 200.

Obtaining Medical Information

Method 600 further comprises step 220 in which medical information about the applicant is obtained. Obtaining medical information 220 proceeds in the same manner as previously described with respect to method 200.

Determining if Applicant is AAT Deficient or has Low Circulating AAT

Method 600 further comprises step 630 in which it is determined if the applicant is AAT deficient or has low circulating AAT. Determining if the applicant is AAT deficient or has low circulating AAT 630 may comprise obtaining or having obtained a biological sample from the applicant and performing or having performed a genotyping assay on the biological sample to determine if the applicant is AAT deficient or has low circulating AAT.

Obtaining or having obtained a biological sample from the applicant may comprise collecting in a collection device a blood sample, urine sample, saliva sample, or other biological sample from which the applicant's AAT level can be determined or from which nucleic acids and/or polypeptides can be isolated. The collection device may comprise specimen cups, swabs, glass slides, test tubes, lancets, tubes, syringes, vials, or any other device known in the art for collecting and/or storing a biological sample from which the applicant's AAT level can be determined or from which nucleic acids and/or polypeptides can be isolated.

Determining if the applicant is AAT deficient or has low circulating AAT 630 further comprises analyzing the collected biological sample to determine if the applicant is AAT deficient or has low circulating AAT. For example, the collected biological sample may comprise a sample of the applicant's blood, and determining if the applicant is AAT deficient or has low circulating AAT 630 may comprise measuring the circulating AAT level present in the blood sample. Alternatively, determining if the applicant is AAT deficient or has low circulating AAT 630 may comprise performing or having performed a genotyping assay on the biological sample to determine if the applicant is AAT deficient. The genotyping assay may detect which alleles of the Serpinal gene are present in the biological sample. The genotyping assay may detect if the applicant has an AAT deficient genotype and/or phenotype directly, or may detect characteristic mRNA of the polymorphic gene or its polypeptide expression product. Detection means suitable for use in the methods and devices of the present invention include those known in the art such as polynucleotides used in amplification, sequencing, and single nucleotide polymorphism (SNP) detection techniques, Invader® assays (Third Wave Technologies, Inc.), Taqman® assays (Applied Biosystems, Inc.), gene chip assays (such as those available from Affymetrix, Inc. and Roche Diagnostics), pyrosequencing, fluorescence resonance energy transfer (FRET)-based cleavage assays, fluorescent polarization, denaturing high performance liquid chromatography (DHPLC), mass spectrometry, and polynucleotides having fluorescent or radiological tags used in amplification and sequencing.

Determining if the applicant is AAT deficient or has low circulating AAT 630 may comprise obtaining information about previous AAT testing from the applicant via a paper form, phone interview, or automated underwriting system 100. Determining if the applicant is AAT deficient or has low circulating AAT 630 may alternatively comprise obtaining information about previous AAT testing from a third party such as a private genetic testing service or a medical provider. Previous AAT testing may have been performed by a medical provider, a private genetic testing company such as 23andMe or Geneology.com, or using a testing device 160. Alternatively, determining if the applicant is AAT deficient or has low circulating AAT 630 may comprise ordering AAT testing for the applicant by a third party such as a private genetic testing service or a medical provider. AAT testing may be ordered from a medical provider, a private genetic testing company such as 23andMe or Geneology.com, or using a testing device 160. The applicant may provide a release giving the insurance agent or underwriter permission to obtain the applicant's AAT test results from a third party.

Alternatively, determining if the applicant is AAT deficient or has low circulating AAT 630 may comprise obtaining information about the applicant's circulating AAT level. Obtaining information about the applicant's circulating AAT level may comprise obtaining information about previous testing from the applicant via a paper form, phone interview, or automated underwriting system 100. Obtaining information about the applicant's circulating AAT level may alternatively comprise obtaining information about previous testing from a third party such as a private testing service or a medical provider. Previous testing may have been performed by a medical provider, a private testing company, or using a testing device 160. Alternatively, obtaining information about the applicant's circulating AAT level may comprise ordering testing for the applicant by a third party such as a private testing service or a medical provider. Testing may be ordered from a medical provider, a private testing company, or using a testing device 160. The applicant may provide a release giving the insurance agent or underwriter permission to obtain the applicant's information from a third party.

Obtained AAT test results may be entered using an input device of user interface module 110. User interface module 110 or application module 120 format the information regarding the applicant's AAT test results and store it in database 130.

Determining Eligibility

Following steps 210, 220, and 630, method 600 proceeds with step 640 in which applicant's eligibility for an insurance policy is determined. Determining the applicant's eligibility for an insurance policy 640 may include determining one or more levels of coverage at which the applicant may obtain an insurance policy, the premium the applicant would have to pay for each level of coverage offered, and even whether to offer a policy to the applicant at all.

Each insurance company has its own underwriting manual that defines rules that the company follows for determining eligibility. Using personal information, medical information, and results of an AAT test obtained in previous steps of method 600 as well as data from actuarial tables and rules from the insurance company's guidebook, the applicant is assigned one or more categories based on the risk of insuring the applicant. This categorization may be assigned using rules encoded in database 130 and accessed by software running on user interface module 110 or application module 120. The initial categorization may be adjusted based on other factors. For example, an applicant with a chronic condition may be assigned a more favorable classification if actively taking steps to improve his or her health and undergoing preventive care.

Figure 5:
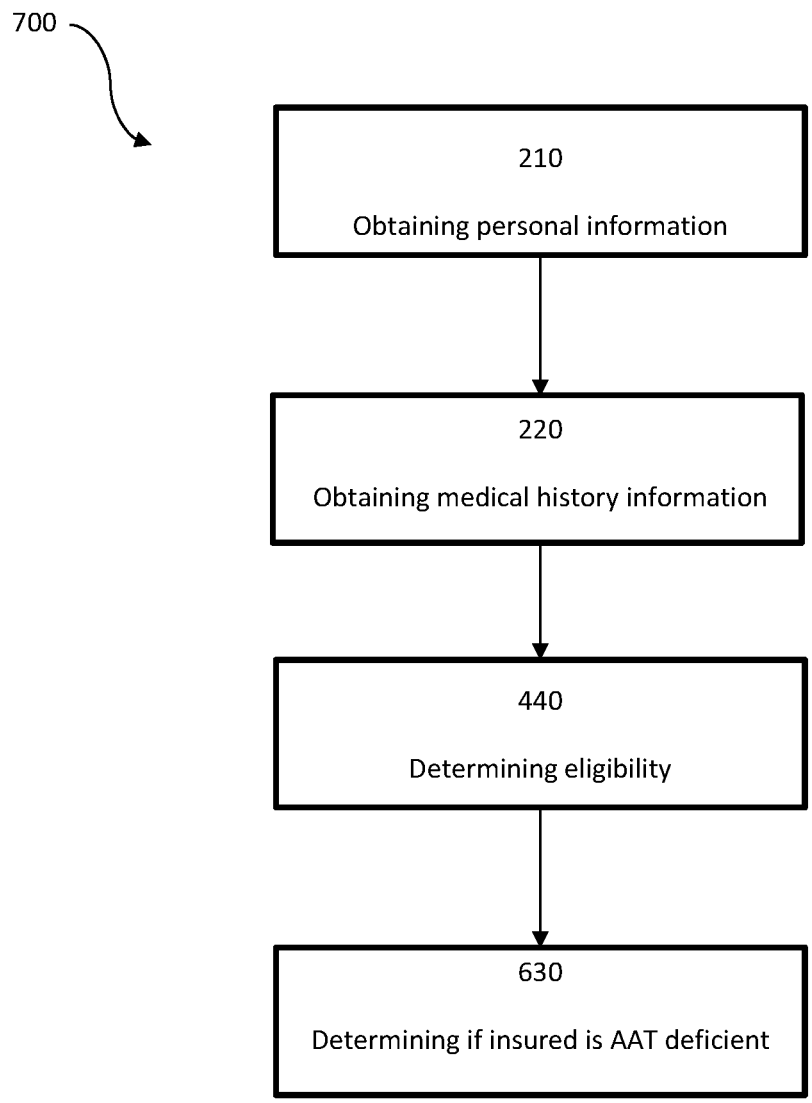
FIG. 5 depicts a method for insurance underwriting and post policy issuance action according to one embodiment.

A Method for Insurance Underwriting and Post Policy Issuance Action as Depicted in FIG. 5

Obtaining Personal Information

As shown in FIG. 5, an alternative method for insurance underwriting and post policy issuance action 700 begins at step 210 in which personal information about an applicant is obtained. Obtaining personal information 210 proceeds in the same manner as previously described with respect to method 200.

Obtaining Medical Information

Method 700 further comprises step 220 in which medical information about the applicant is obtained. Obtaining medical information 220 proceeds in the same manner as previously described with respect to method 200.

Determining Eligibility

Once personal and medical information about the applicant have been obtained, the method 700 proceeds to step 440 in which eligibility for an insurance policy is determined. Step 440 proceeds in the same manner as previously described with respect to method 400.

Determining if Applicant is AAT Deficient

Once the applicant's eligibility for an insurance policy has been determined at step 440, the applicant is now referred to as the insured, and method 700 proceeds to step 630 in which it is determined if the insured is AAT deficient or has low circulating AAT. Determining if the insured is AAT deficient or has low circulating AAT 630 proceeds in the same manner as previously described with respect to method 600. After eligibility for an insurance policy is determined at step 440, the insured is under no obligation to supply any information related to genetic testing or determination of AAT levels as determined in step 630 to the insurance provider. Testing to determine the insured's AAT status benefits the insured by allowing the insured to seek treatment that improves his or her quality of life and potentially extends his or her life. Further, the insurance provider benefits when insureds seek such treatment as fewer health, life, disability, or long term care insurance claims require payment by the insurance provider.

The methods 200/400/600/700 have many benefits and advantages including, but not limited to providing a more complete risk profile of potential insureds to insurance companies and providing important health information to individuals. As AAT deficiency or low circulating AAT often leads to the development of emphysema, lung cancer, and other serious health conditions, knowledge of AAT deficiency or low circulating AAT can prompt the applicant to seek treatment or preventive care. Through early treatment or prevention of conditions caused by AAT deficiency or low AAT levels, many lives can be saved, and quality of life can be vastly improved. Further, insurance companies benefit when their insured customers, having knowledge of their AAT deficiency or low AAT levels, lead longer, healthier lives and fewer health, life, disability, or long term care insurance claims requiring payment. These and other benefits and advantages of the methods 200/300/400/500/600/700 are apparent from the specification and claims.

REFERENCE NUMERALS

100—system for insurance underwriting and post policy issuance action
110—user interface module
120—application module
130—database
160—testing device (for at home testing for alpha-1 antitrypsin deficiency)
200—a method for insurance underwriting and post policy issuance action
210—obtaining personal information
220—obtaining medical history information
230—obtaining information regarding the applicant's AAT status
240—determining eligibility (using personal, medical, and genetic information)
250—providing additional information
350—ordering a test for alpha-1 antitrypsin deficiency
400—an alternative method for insurance underwriting and post policy issuance action
440—determining eligibility (using personal and medical information)
600—an alternative method for insurance underwriting and post policy issuance action
630—determining if applicant is alpha-1 antitrypsin deficient or has low circulating AAT
640—determining eligibility (using personal information, medical information, and results of AAT test)
700—an alternative method for insurance underwriting and post policy issuance action

What is claimed:

1. A method of insurance underwriting and post policy issuance action comprising:
providing remote access to a user over a network to an automated insurance underwriting system so that the user can input personal information through a user input device having a user interface module;

obtaining the personal information about an applicant on the user input device;

the personal information includes at least one habit;

the user interface module having software configured to allow the user to input the personal information to the automated insurance underwriting system;

the personal information in a first data form that is readable by the user;

translating the personal information into a second data form for storage in a remote database of the automated insurance underwriting system by the software on the user interface module;

the second data form configured to allow the personal information to be retrievable from the remote database;

communicating, by the software of the user interface module, the translated personal information to the remote database;

storing the translated personal information in the remote database;

the remote database further comprising policy rules and at least one actuarial table for the automated insurance underwriting system;

obtaining medical information about the applicant on the user input device of the user interface module;

wherein the medical information is in the first data form, translating the medical information into the second data form for storage in the remote database by the software on the user interface module;

communicating, by the software of the user interface module, the medical information to the remote database;

analyzing a biological sample collected from the applicant using a device configured to draw a blood sample from the applicant and measure a level of alpha-1 antitrypsin in the blood sample and determining the applicant's positive alpha-1 antitrypsin deficiency status based on analysis of the biological sample;

processing by the software of the user interface module the personal information, the medical information and the alpha-1 antitrypsin deficiency status;

analyzing by the software of the user interface module the personal information, the medical information, the alpha-1 antitrypsin deficiency status with the policy rules, and the at least one actuarial table to categorize a risk level of the applicant;

determining by the user interface module a level of coverage based on the analysis of the personal information, medical information, and alpha-1 antitrypsin deficiency status and the policy rules and the category of risk level;

analyzing, by the user interface module, the at least one habit and the alpha-1 antitrypsin deficiency status with the category of risk level to determine if the habit lowers the risk level of the applicant;

determining by the software of the user interface module if the level of coverage needs to be adjusted based upon the at least one habit, the category of risk level, and the alpha-1 antitrypsin deficiency status; and granting an insurance policy based on the personal information, medical information, risk level of the applicant, and alpha-1 antitrypsin deficiency status.

2. The method of claim 1 further comprising determining a second level of coverage to grant to the applicant based on the personal information, medical information, and alpha-1 antitrypsin deficiency status.

3. The method of claim 1 wherein determining the applicant's eligibility further comprises determining a premium at which to provide an insurance policy to the applicant based on the personal information, medical information, and alpha-1 antitrypsin deficiency status.

4. The method of claim 1 further comprising providing information about alpha-1 antitrypsin deficiency to the user.

5. The method of claim 1 wherein the applicant is referred to as an insured following the step of determining the applicant's eligibility for an insurance policy based on the personal information, medical information, and alpha-1 antitrypsin deficiency status, and wherein the method further comprises providing information about alpha-1 antitrypsin deficiency to the insured.

6. The method of claim 5 wherein information about alpha-1 antitrypsin deficiency comprises information about where to obtain a testing device for at home testing for alpha-1 antitrypsin deficiency.

7. The method of claim 1 further comprising ordering a genetic test for the applicant to determine if the applicant has alpha-1 antitrypsin deficiency.

8. A method of insurance underwriting and post policy issuance action comprising:

providing remote access to a user over a network to an automated insurance underwriting system so that the user can input personal information through a user input device having a user interface module;

obtaining personal information about an applicant on the user input device of the user interface module;

the personal information includes at least one habit;

the user interface module having a software configured to allow the user to input the personal information to the automated insurance underwriting system, the personal information in a readable data form that is readable by the user;

translating the personal information into a standard data form for storage in a remote database of the automated insurance underwriting system by the software of the user interface module, the standard data form configured to allow the personal information to be retrievable by the user input device from the remote database;

communicating, by the software of the user interface module, the personal information in the standard data form to the remote database;

the remote database further comprising policy rules and at least one actuarial table;

storing the personal information in the standard data form in the remote database;

obtaining medical information about the applicant on the user input device of the user interface module in the readable data form;

translating the medical information from the readable data form into the standard data form by the software;

communicating, by the software of the user interface module, the medical information in the standard data form to the remote database;

storing the translated medical information in the remote database;

retrieving by the software of the user interface module the translated personal information and the translated medical information from the remote database;

analyzing by the user interface module the personal information, the medical information, the policy rules, and the at least one actuarial table;

determining by the user interface module a risk level of the applicant based on the analysis of the personal information, medical information and the policy rules;

determining the applicant's eligibility for an insurance policy based on the risk level;
granting the applicant an insurance policy;
obtaining positive test results by testing that the applicant has alpha-1 antitrypsin deficiency by drawing a blood sample from the applicant and measuring a level of alpha-1 antitrypsin in the blood sample using a testing device after granting the applicant an insurance policy;
inputting the positive test results into the user input device of the user interface module utilizing the software;
the positive test results is in the readable data form;
translating the positive test results into the standard data form for storage in the remote database of the automated insurance underwriting system by the software of the user interface module;
the standard data form configured to allow the positive test results to be retrievable by the user input device from the remote database;
communicating, by the software of the user interface module, the positive test results in the standard data form to the remote database;
storing the positive test results in the remote database
retrieving by the user interface module at least the positive test results and the at least one habit from the remote database; and
determining by the user interface module if the insurance policy needs to be adjusted based upon the at least one habit and the positive test results;
the at least one habit including preventative care.

9. The method of claim 8 further comprising determining a level of coverage to grant to the applicant based on the personal information and medical information.

10. The method of claim 8 further comprising determining a premium at which to provide the insurance policy to the applicant based on the personal information, medical information, and test results.

11. The method of claim 8 further comprising providing information about alpha-1 antitrypsin deficiency to the applicant.

12. The method of claim 8 further comprising ordering a genetic test for the applicant to determine if the applicant has alpha-1 antitrypsin deficiency.

13. A method of insurance underwriting and post policy issuance action comprising:
providing remote access to a user over a network to an automated insurance underwriting system so that the user can input personal information through a user input device having a user interface module;
obtaining or having obtained the personal information about an applicant by software on the user input device of the user interface module;
the personal information includes at least one habit;
wherein the personal information is in a readable data form that is readable by the user;
translating the personal information into a standard data form for storage in a remote database of the automated insurance underwriting system by the software on the user interface module;
the standard data form configured to allow the personal information to be retrievable by the user input device from the remote database;
communicating, by the software on the user interface module, the personal information to the remote database;
the remote database further comprising policy rules and at least one actuarial table;
obtaining or having obtained medical information about the applicant by the software on the user input device of a user interface module;
wherein the medical information is in the readable data form;
translating the medical information from the readable data form into the standard data form by the software on the user input device of the user interface module;
communicating, by the user interface module, the medical information to the database;
storing the translated medical information in the remote database;
determining that the applicant is alpha-1 antitrypsin deficient by:
obtaining a biological sample from the applicant, and analyzing the biological sample to determine if the applicant is alpha-1 antitrypsin deficient;
inputting the alpha-1 antitrypsin deficiency into the user input device of the user interface module utilizing the software;
wherein the alpha-1 antitrypsin deficiency is in the readable data form that is readable by the user;
translating the alpha-1 antitrypsin deficiency from the readable data form into the standard data form for storage in the remote database by the software of the user interface module,
the standard data form configured to allow the alpha-1 antitrypsin deficiency to be retrievable by the user input device from the remote database;
communicating, by the software of the user interface module, the alpha-1 antitrypsin deficiency in the standard data form to the remote database;
storing the alpha-1 antitrypsin deficiency in the remote database;
retrieving by the user interface module at least the alpha-1 antitrypsin deficiency, the personal information and the medical information from the remote database;
processing by the user interface module the personal information, the medical information and the alpha-1 antitrypsin deficiency;
analyzing by the user interface module the personal information, the medical information, the alpha-1 antitrypsin deficiency, the policy rules, and the at least one actuarial table;
determining by the user interface module a level of coverage based on the analysis of the personal information, medical information, the alpha-1 antitrypsin deficiency, and the policy rules;
determining by the user interface module if the level of coverage needs to be adjusted based upon the at least one habit and the alpha-1 antitrypsin deficiency; and
granting the applicant an insurance policy based on the personal information, medical information, and the determination that the applicant is alpha-1 antitrypsin deficient.

14. The method of claim 13 further comprising determining a second level of coverage to grant to the applicant based on the personal information, medical information, and the determination of whether the applicant is alpha-1 antitrypsin deficient.

15. The method of claim 13 further comprising determining a premium at which to provide the insurance policy to the applicant based on the personal information, medical information, and the determination of whether the applicant is alpha-1 antitrypsin deficient.

16. The method of claim 13 wherein analyzing the biological sample to determine if the applicant is alpha-1 antitrypsin deficient comprises testing the biological sample using a testing device for at home testing for alpha-1 antitrypsin deficiency.

17. A method of insurance underwriting and post policy issuance action comprising:
providing remote access to a user over a network to an automated insurance underwriting system so that the user can input personal information through a user input device having a user interface module;
obtaining or having obtained the personal information about an applicant on the user interface module;
wherein the personal information is in a first data form that is readable by the user;
translating the personal information into a second data form for storage in a remote database of the automated insurance underwriting system by a software on the user interface module;
the second data form configured to allow the personal information to be retrievable by the user input device from the remote database;
obtaining or having obtained medical information about the applicant on the user interface module;
wherein the medical information is in the first data form that is readable by the user;
translating the medical information into the second data form for storage in the remote database of the automated insurance underwriting system by the software;
the second data form configured to allow the medical information to be retrievable by the user input device from the remote database;
communicating, by the user interface module, the medical information to the remote database;
retrieving, by the user interface module, the medical information and the personal information from the remote database;
processing by the user interface module the personal information and the medical information;
analyzing by the user interface module the personal information, and the medical information;
determining the applicant's eligibility for an insurance policy based on the personal information and medical information;
granting an insurance policy to the applicant;
after granting the insurance policy to the applicant based on the personal information and medical information, determining that applicant is alpha-1 antitrypsin deficient by:
obtaining a biological sample from the applicant, and analyzing the biological sample to determine if the applicant is alpha-1 antitrypsin deficient;
inputting the alpha-1 antitrypsin deficiency into the user input device of the user interface module utilizing the software;
wherein the alpha-1 antitrypsin deficiency is in the first data form that is readable by the user;
translating the alpha-1 antitrypsin deficiency from the first data form into the second data form for storage in the remote database by the software of the user interface module;
the second data form configured to allow the alpha-1 antitrypsin deficiency to be retrievable by the user input device from the remote database;
communicating, by the software of the user interface module, the alpha-1 antitrypsin deficiency in the second data form to the remote database;
storing the alpha-1 antitrypsin deficiency in the remote database;
retrieving by the user interface module at least the alpha-1 antitrypsin deficiency, the personal information and the medical information from the remote database;
determining by the user interface module if the insurance policy needs to be adjusted based upon the alpha-1 antitrypsin deficiency.

18. The method of claim 17 wherein analyzing the biological sample to determine if the applicant is alpha-1 antitrypsin deficient comprises testing the biological sample using a testing device for at home testing for alpha-1 antitrypsin deficiency.

19. The method of claim 17 further comprising determining a second level of coverage to grant to the applicant.

20. The method of claim 17 further comprising determining a premium at which to provide the insurance policy to the applicant.

21. A method of insurance underwriting and post policy issuance action by an insurance provider comprising:
providing remote access to a user over a network to an automated insurance underwriting system so that the user can input personal information through a user input device of a user interface module;
obtaining or having obtained personal information about an applicant on the user input device having the user interface module utilizing a software of the user interface module;
the personal information includes at least one habit;
wherein the personal information is in a readable data form that is readable by the user;
translating the personal information into a standard data form for storage in a remote database of the automated insurance underwriting system by the software on the user interface module;
the standard data form configured to allow the personal information to be retrievable by the user input device from the remote database utilizing the software of the user interface module,
communicating, by the software of the user interface module, the personal information to the remote database;
the remote database further comprising policy rules and at least one actuarial table;
storing the personal information in the standard data form in the remote database;
obtaining or having obtained medical information about the applicant on the user input device of the user interface module;
wherein the medical information is in the readable data form that is readable by the user;
translating the medical information into the standard data form for storage in the remote database of the automated insurance underwriting system by the software;
communicating, by the software of the user interface module, the medical information to the remote database;
storing the medical information in the remote database;
processing by the user interface module the personal information and the medical information;
analyzing by the user interface module the personal information, the medical information, the policy rules, and the at least one actuarial table to categorize a risk level of the applicant;
determining the applicant's eligibility for an insurance policy based on the personal information, medical information, and risk level of the applicant;
wherein the applicant is referred to as an insured after determining eligibility;

determining by the user interface module a level of coverage based on the analysis of the personal information, medical information, risk level of applicant, and the policy rules;

after granting the insurance policy to the insured, ordering a test to determine if the insured is alpha-1 antitrypsin deficient by:
- obtaining a biological sample from the insured, and
- analyzing the biological sample to determine that the insured is alpha-1 antitrypsin deficient;

inputting the alpha-1 antitrypsin deficiency into the user input device of the user interface module utilizing the software;

wherein the alpha-1 antitrypsin deficiency is in the readable data form that is readable by the user;

translating the alpha-1 antitrypsin deficiency from the readable data form into the standard data form for storage in the remote database by the software of the user interface module;

the standard data form configured to allow the alpha-1 antitrypsin deficiency to be retrievable by the user input device from the remote database;

communicating, by the software of the user interface module, the alpha-1 antitrypsin deficiency in the standard data form to the remote database, storing the positive alpha-1 antitrypsin deficiency in the remote database;

retrieving by the user interface module at least the alpha-1 antitrypsin deficiency, the personal information and the medical information from the remote database;

analyzing by the user interface module the personal information, the medical information, the alpha-1 antitrypsin deficiency, the policy rules, and the at least one actuarial table to categorize a second risk level of the applicant;

determining by the user interface module if the insurance policy needs to be adjusted based upon the at least one habit, the second risk level and the alpha-1 antitrypsin deficiency;

wherein the at least one ha les preventative care.

22. The method of claim 21 wherein analyzing the biological sample to determine if the insured is alpha-1 antitrypsin deficient comprises analyzing the biological sample using an at home testing device configured to detect alpha-1 antitrypsin deficiency.

23. The method of claim 21 further comprising determining a second level of coverage to grant to the applicant.

24. The method of claim 21 further comprising determining a premium at which to provide the insurance policy to the applicant.

25. The method of claim 21 wherein the insured is not required to provide results of the test to the insurance provider.

* * * * *